US011113180B2

(12) United States Patent
Gurajada

(10) Patent No.: US 11,113,180 B2
(45) Date of Patent: Sep. 7, 2021

(54) EFFICIENTLY TRACKING CODE LOCATION OF RUN-TIME EVENTS IN SYSTEM SOFTWARE

(71) Applicant: salesforce.com, inc., San Francisco, CA (US)

(72) Inventor: Aditya P. Gurajada, San Ramon, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/778,235

(22) Filed: Jan. 31, 2020

(65) Prior Publication Data

US 2021/0240593 A1    Aug. 5, 2021

(51) Int. Cl.
  *G06F 11/36*    (2006.01)
  *G06F 8/77*     (2018.01)
(52) U.S. Cl.
  CPC .............. *G06F 11/364* (2013.01); *G06F 8/77* (2013.01); *G06F 11/3612* (2013.01)
(58) Field of Classification Search
  CPC ....... G06F 11/364; G06F 11/3612; G06F 8/77
  USPC .................................................. 717/124–167
  See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,615,400 A * | 3/1997 | Cowsar ............... G06F 9/44521 719/332 |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |

(Continued)

OTHER PUBLICATIONS

Agarwal, Anant, Richard L. Sites, and Mark Horowitz. "ATUM: A new technique for capturing address traces using microcode." ACM SIGARCH Computer Architecture News 14.2 (1986): pp. 119-127. (Year: 1986).*

(Continued)

*Primary Examiner* — Satish Rampuria
(74) *Attorney, Agent, or Firm* — Dergosits & Noah LLP; Todd A. Noah

(57) ABSTRACT

Methods, systems and computer program products for tracking, encoding and decoding the code-location of runtime events. The system receives an encoded identifier function call as a parameter for a first function included in at least one file in a plurality of files of a source code base. The system returns a compact encoded identifier generated by the encoded identifier function call during compilation of the plurality of files of the source code base. In response to receiving a runtime event's identifier from execution of the source code base, the system decodes the encoded identifier to trace back to a unique location of the first function in the source code base, thereby identifying the filename and line number where the event occurred.

17 Claims, 10 Drawing Sheets

(56) References Cited

U.S. PATENT DOCUMENTS

| | | | |
|---|---|---|---|
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,202,199 B1* | 3/2001 | Wygodny | G06F 11/3636 |
| | | | 702/183 |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,158,924 B2* | 1/2007 | Williams | G06F 30/33 |
| | | | 703/17 |
| 7,340,411 B2 | 3/2008 | Cook | |
| 7,356,482 B2 | 4/2008 | Frankland et al. | |
| 7,401,094 B1 | 7/2008 | Kesler | |
| 7,620,655 B2 | 11/2009 | Larsson | |
| 7,698,160 B2 | 4/2010 | Beaven et al. | |
| 7,730,478 B2 | 6/2010 | Weissman | |
| 7,779,039 B2 | 8/2010 | Weissman et al. | |
| 7,779,475 B2 | 8/2010 | Jakobsen et al. | |
| 7,851,004 B2 | 12/2010 | Hirao et al. | |
| 8,010,663 B2 | 8/2011 | Firminger et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,209,308 B2 | 6/2012 | Jakobson et al. | |
| 8,275,836 B2 | 9/2012 | Beaven et al. | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 9,904,615 B1* | 2/2018 | O'Dowd | G06F 11/3636 |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2008/0134148 A1* | 6/2008 | Clark | G06F 11/3636 |
| | | | 717/128 |
| 2009/0063415 A1 | 3/2009 | Chatfield et al. | |
| 2009/0100342 A1 | 4/2009 | Jakobsen | |
| 2009/0177744 A1 | 7/2009 | Marlow et al. | |
| 2012/0233137 A1 | 9/2012 | Jakobsen et al. | |
| 2013/0061212 A1* | 3/2013 | Krause | G06F 9/45516 |
| | | | 717/128 |
| 2013/0218948 A1 | 8/2013 | Jakobsen | |
| 2013/0218949 A1 | 8/2013 | Jakobsen | |
| 2013/0218966 A1 | 8/2013 | Jakobsen | |
| 2014/0359537 A1 | 12/2014 | Jakobsen et al. | |
| 2015/0007050 A1 | 1/2015 | Jakobsen et al. | |
| 2015/0082325 A1* | 3/2015 | Aharonov | G06F 11/3636 |
| | | | 719/318 |
| 2015/0095162 A1 | 4/2015 | Jakobson et al. | |
| 2015/0172563 A1 | 6/2015 | Jakobson et al. | |

OTHER PUBLICATIONS

Luk, Chi-Keung, et al. "Pin: building customized program analysis tools with dynamic instrumentation." Acm sigplan notices 40.6 (2005): pp. 190-200. (Year: 2005).*

Niu, Nan, et al. "Traceability-enabled refactoring for managing just-in-time requirements." 2014 IEEE 22nd International Requirements Engineering Conference (RE). IEEE, 2014.pp. 133-142 (Year: 2014).*

Sun, Mingshen, Tao Wei, and John CS Lui. "Taintart: A practical multi-level information-flow tracking system for android runtime." Proceedings of the 2016 ACM SIGSAC Conference on Computer and Communications Security. 2016.pp. 331-342 (Year: 2016).*

(56) References Cited

OTHER PUBLICATIONS

Monsanto, Christopher, et al. "A compiler and run-time system for network programming languages." Acm sigplan notices 47.1 (2012): pp. 217-230. (Year: 2012).*

Hangai, Sudheendra, and Monica S. Lam. "Tracking down software bugs using automatic anomaly detection." Proceedings of the 24th International Conference on Software Engineering. ICSE 2002. IEEE, 2002.pp. 291-301 (Year: 2002).*

* cited by examiner

EFFICIENTLY TRACKING CODE LOCATION OF RUN-TIME EVENTS IN SYSTEM SOFTWARE

TECHNICAL FIELD

The present disclosure relates generally to tracking of runtime events in computer system software.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Conventional systems provide for environments for the compilation of source code that identify source code errors that prevent successful compilation. A software developer can use the identified source code errors to revise and modify the source code such that subsequent compilation is successfully completed. In addition, conventional environments for runtime execution of source code report when one or more events occur that may be, for example, runtime errors.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
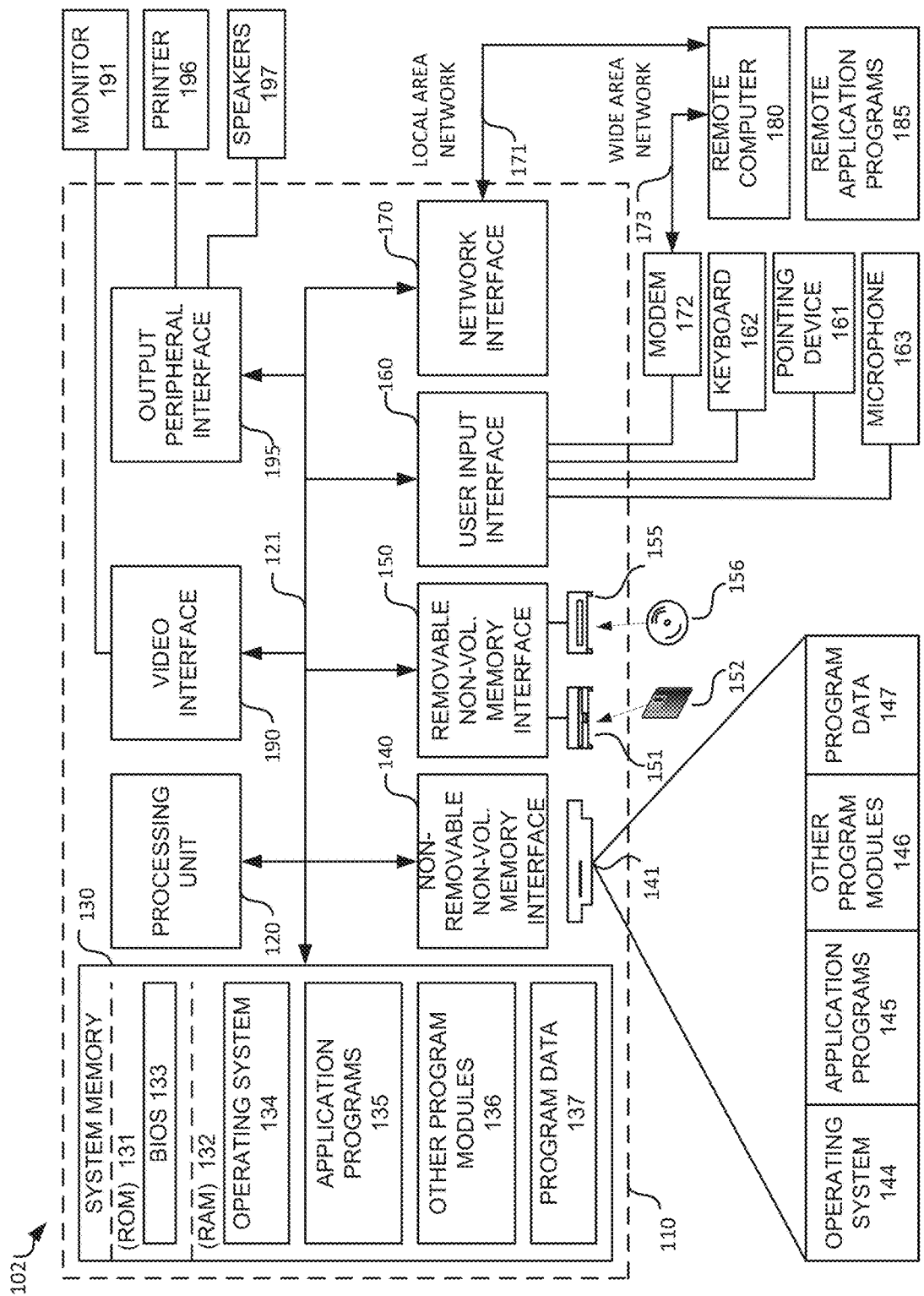
FIG. 1 shows a diagram of an example computing system that may be used with some embodiments.

In conventional systems, because of the complexity and volume of the source code being executed, it is challenging for a software developer to anticipate which portions of source code may trigger and be an origin of such an event at runtime. When a runtime event occurs, a software developer is met with the challenge of tracing the runtime event back to a portion of source code that is the origin of the runtime event. When reviewing a runtime error, conventional systems often leave the software developer no choice but to perform an inefficient and manual trial-and-error search throughout the source code in order to locate the origin of the runtime event. Moreover, if the software developer incorrectly selects a portion of source code as the origin of runtime event and troubleshoots, or performs root-cause analysis, and revises the incorrect portion of source code, the software developer has further introduced instability in the source code without actually identifying and correcting for the runtime event. In some scenarios, the source code may be quite complex and voluminous, which makes the conventional approach of the inefficient and manual trial-and-error search quite burdensome and results in an improper use of a software development team's time and resources.

In accordance with embodiments described herein, there are provided methods, systems and computer program products for an event tracker. The event tracker returns unique encoded identifiers generated during source code compilation that can be later used to identify a source code location where the event occurred during execution. Each returned unique encoded identifier corresponds to a source code line number in a particular file in a source code base. The event tracker decodes a specific encoded identifier. The decoded identifier reveals a filename and source code line number that may be an origin of the runtime event.

In one embodiment, the event tracker receives an encoded identifier function call as a parameter for a first function included in at least one file in a plurality of files of a source code base. The event tracker returns an encoded identifier generated by the encoded identifier function call during compilation of the plurality of files of the source code base. In response to receiving a unique encoded identifier of a runtime event from execution of the source code base, the event tracker decodes the encoded identifier to trace back to a location of the first function in the source code base.

According to an embodiment, the event tracker receives portions of a source code base being submitted by one or more software developer user accounts ("developer-user"). The source code base may include multiple functions distributed across a plurality of files. For example, one or more developer-users may insert an encoded identifier function call ("EVLOC( )") as a parameter in any of the functions in the source code base.

According to an embodiment, during compilation of the source code base, the event tracker builds the compiled source code base to include a unique filename index number for each file in the source code base. In various embodiments, a filename index number uniquely identifies a given file in the source code base. In addition, when any function that includes the function call of EVLOC( ) as a parameter is compiled, the EVLOC( ) returns a unique encoded identifier. The event tracker receives each returned unique encoded identifier and stores each returned unique encoded identifier in pre-allocated storage memory associated with the source code base.

According to an embodiment, when an event occurs during runtime, the event may be accompanied with its event-location encoded identifier and an error type, such as, for example, a memory allocation event type, a lock acquisition on database object event type, latch acquisition event type and a raised buffering exception event type. Based on receipt of the runtime event and its corresponding encoded identifier, a developer-user may access a user interface provided by the event tracker. The event tracker user interface provides functionalities for the developer-user(s) to view, select and decode any of the stored unique encoded identifiers established automatically during compilation returned during execution. The event tracker may receive an indication the developer-user has selected an encoded identifier from compilation that matches the runtime event's encoded identifier. The event tracker may receive an indication the developer-user has selected a functionality of the event tracker user interface to decode the matching encoded identifier from compilation and the event tracker decodes the selected encoded identifier. The decoded identifier reveals a corresponding filename index number and a line number(s). The event tracker receives a request by the developer-user to access the particular file in the source code base that is identifiable by the corresponding decoded filename index number. Further, upon accessing the particular file in the source code base, the developer-user may request to view the decoded line number(s), which indicates the source code line number(s) at which a given function that includes the EVLOC( ) parameter appears. It is understood that various embodiments are not limited to implementing the EVLOC( ) function.

If the given function identified by decoding the select encoded identifier is of a function type that corresponds to the runtime event location type received during runtime, the developer-user has then efficiently and unambiguously located the origin of the runtime event regardless of whether source code base includes a large amount of files and a voluminous amount of source code.

While one or more implementations and techniques are described herein as implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like, and other system software, without departing from the scope of the embodiments claimed.

In addition, according to various embodiments, it is understood that an "event" may associated with execution of computer software resulting in a state change Some examples of such events may be, as non-limiting examples, raising an error during processing, raising an exception indicating validity of user input, and acquisition of a type of system resource (e.g. memory allocation, buffer allocation, lock acquisition or release of previously-held locks, start of an I/O request).

Any of the embodiments described herein may be used alone or together with one another in any combination. The one or more implementations encompassed within this specification may also include embodiments that are only partially mentioned or alluded to or are not mentioned or alluded to at all in the abstract. Although various embodiments may have been motivated by various deficiencies with the prior art which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Some embodiments of the present invention may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine program product discussed below.

Some embodiments of the present invention may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 102 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 102 typically includes a variety of computer program product. Computer program product can be any available media that can be accessed by computing system 102 and includes both volatile and nonvolatile media, removable and non-removable media. By way of example, and not limitation, computer program product may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 102. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing system 102, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 102 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 102. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 102 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 102 may operate in a networked environment using logical connections to one or more remote computers, such as a remote computer 180. The remote computer 180 may be a personal computer, a handheld device, a server, a router, a network PC, a peer device or other common network node, and typically includes many or all of the elements described above relative to the computing system 102. The logical connections depicted in FIG. 1 includes a local area network (LAN) 171 and a wide area network (WAN) 173, but may also include other networks. Such networking environments are commonplace in offices, enterprise-wide computer networks, intranets and the Internet.

When used in a LAN networking environment, the computing system 102 may be connected to the LAN 171 through a network interface or adapter 170. When used in a WAN networking environment, the computing system 102 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 102, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some embodiments of the present invention may be carried out on a computing system such as that described with respect to FIG. 1. However, some embodiments of the present invention may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 2:
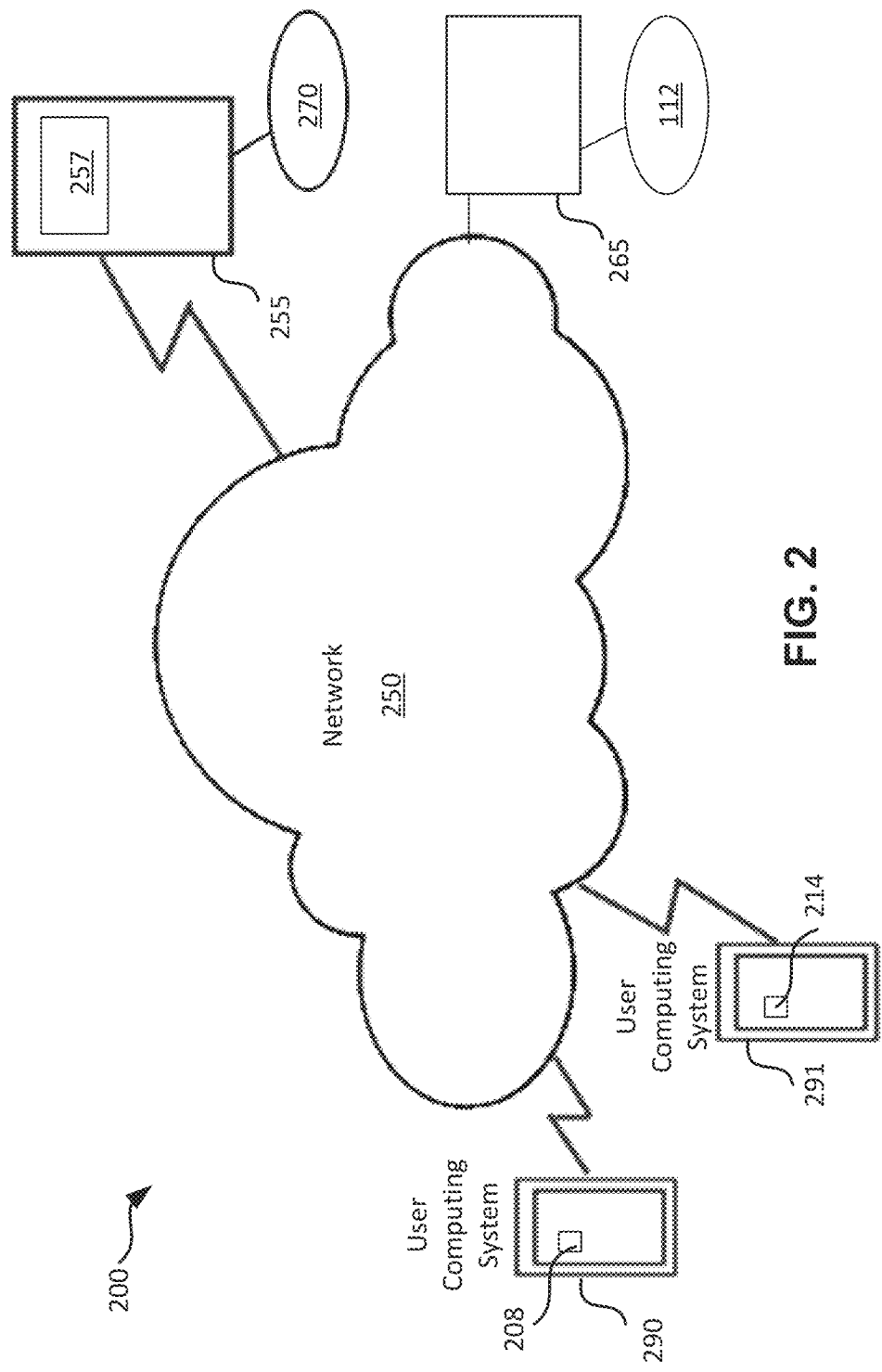
FIG. 2 shows a diagram of an example network environment that may be used with some embodiments.

FIG. 2 shows a diagram of an example network environment that may be used with some embodiments of the present invention. Network environment 200 includes computing systems 290 and 291. One or more of the computing systems 290 and 291 may be a mobile computing system. The computing systems 290 and 291 may be connected to the network 250 via a cellular connection or via a Wi-Fi router (not shown). The network 250 may be the Internet. The computing systems 290 and 291 may be coupled with server computing systems 255 and 265 via the network 250.

Each of the computing systems 290 and 291 may include an application module such as module 208 or 214. For example, a user (e.g., a developer) may use the computing system 290 and the application module 208 to connect to and communicate with the server computing system 255 and log into application 257 (e.g., a Salesforce.com® application).

For some embodiments, the user may use the application 257 to develop, manage, install and execute a software package(s) for pausing and resuming virtual environments and one or more of pre-processing and post-processing customized codes related to development, management, installation and execution of the software package(s). The pre-processing and post-processing customized codes may be executed by the server computing system 255. The development, management, installation and execution (or portions thereof) may be executed by the server computing system 265 associated with the server computing system 255. The server 265 may be associated with database 112. For example, the server computing system 265 may be configured to develop, manage, install and execute a software package(s) using a product of Salesforce.com.

Figure 3:
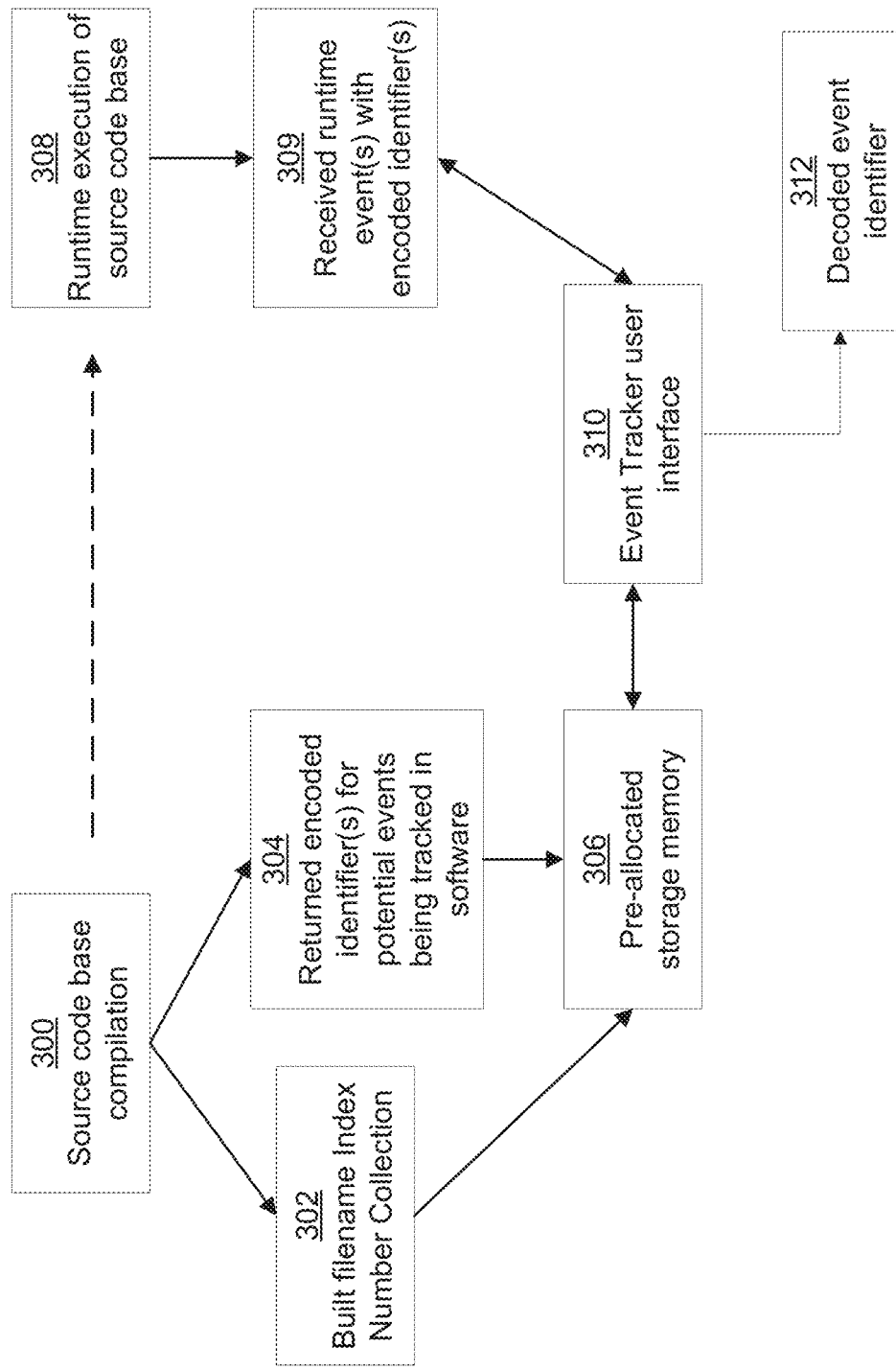
FIG. 3 is a high-level diagram of the event tracker, in an embodiment.

FIG. 3 is a high-level diagram of the event tracker, in an embodiment. The references numerals in FIG. 3 refer to modules, processing, steps and/or data flow that is included in, performed by, managed by, triggered by and/or involves the event tracker.

According to one embodiment, a source code base may include multiple source code function across a plurality of files. As a developer-user enters or modifies source code for a first function, the event tracker receives an encoded identifier function call—such as, for example, EVLOC( )—as a parameter to be passed into the first function. During source code compilation 300, the encoded identifier function call generates an encoded identifier which is returned 304 by the event tracker.

In one embodiment, a returned encoded identifier may be a unique 4-byte number generated by the EVLOC( ) function call parameter in the first function. The 4-byte number is a compressed encoding. When the event tracker decodes the 4-byte number (i.e. a returned encoded identifier), the resulting decoded identifier includes a first and a second portion. The first portion identifies the filename index number of a particular file in the source code base in which in the first function is located and the second portion of the decoded identifier identifies the line number of the particular file at which source code of the call of the first function occurs.

Also, during source code compilation 300, the event tracker builds a filename index number collection in which a unique filename index number is generated for each file of the source code base. The event tracker places the filename index number collection 302 and any returned encoded identifier 304 in pre-allocated storage memory 306 associated with the source code base. In one embodiment, the storage memory can be pre-allocated prior to source code compilation 300.

During a runtime execution of the source code base 308, the event tracker may receive one or more encoded identifiers of runtime events 309. Each received runtime identifier may include an identification of event type and a corresponding encoded identifier generated during runtime execution. For example, an event type may be a memory allocation event, a lock acquisition on database object event, a latch acquisition event or a raised buffering exception event. A user interface of the event tracker 310 provides a developer-user(s) with access to the received runtime event identifier(s) 309 and the pre-allocated storage memory 306. The event tracker user interface 310 provides a functionality to view the returned encoded identifiers and to select any of the returned encoded identifiers. Based on encoded identifier selection, the event tracker decodes the select encoded identifier to generate the first and second portion of a decoded selected identifier 312. The developer-user may access and view the filename index number collection 302 via the event tracker user interface 310 in order to find a match between the decoded first portion and a filename index number of a particular file in the filename index number collection 302. The particular file associated with the matched filename index number may identify a particular file in the source code base that includes source code of a function call that has an encoded identifier function call as a parameter. The decoded second portion identifies a source code line number in the particular file at which the encoded identifier function call is located.

For example, in one embodiment, the first function may be a memory allocation function, such as "palloc_internal (size, EVLOC( ) . . . " where size is a first parameter and EVLOC( )s an encoded identifier function call as a second parameter. A particular runtime event 309 may be a memory allocation error-event type and the event tracker user interface 310 provides a view of the runtime error-event 309. The event tracker user interface 310 decodes a selected encoded identifier based on developer-selection and generates a decoded selected identifier 312. The developer-user may use the decoded first and second portions of the select identifier 312 to trace back to a file that includes the first function of "palloc_internal(size, EVLOC( ) . . . " The developer-user may view the source code of the first function and thereby discern that the first function relates to memory allocation based on the "palloc_internal" name of the first function. Since the first function relates to memory allocation and the runtime error is a memory allocation error type, the developuser may further determine that an actual origin of the runtime memory allocation event may be the "palloc_internal" first function.

It is further understood that different instances of the "palloc_internal" function may be called in different files of the source code base, but each instance of the "palloc_internal" function may include an input variable parameter that is a call to the same EVLOC( ) encoded identifier function call. When each instance of the "palloc_internal" function undergoes compilation, each respective call of EVLOC( ) generates a different and unique encoded identifier even though instance of the same "palloc_internal" function is being compiled.

Figure 4:
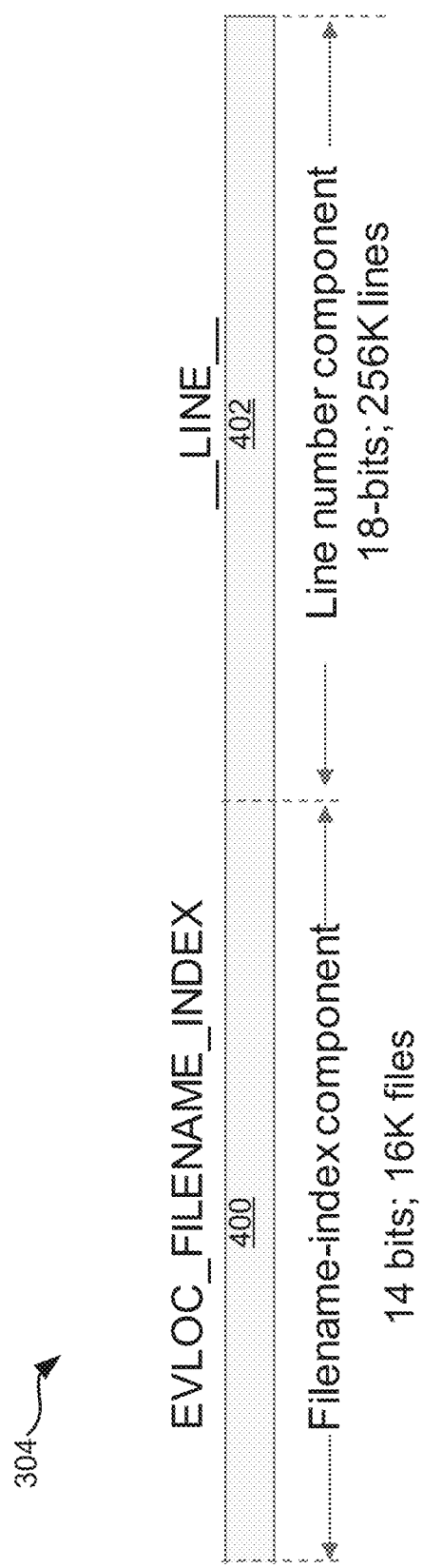
FIG. 4 is a high-level diagram of a returned encoded identifier, in an embodiment.

FIG. 4 is a high-level diagram of a returned encoded identifier, in an embodiment. The returned encoded identifier 304 illustrated in FIG. 4 may be, for example, a 4-byte number with a first portion 400 which is a compressed encoding for a filename index number and a second portion 402 which is a compressed encoding for line number of source code in a given file identified by the first portion's 400 filename index number. In one embodiment, as a non-limiting example, the first portion 400 may be an encoding of 14 bits that identifies the given file from 16K files of a source code base. The second portion 402 may be an encoding of 18 bits that identifies a line number from among 256K lines of source code. It is understood that other embodiments are not limited to an encoded identifier that is a 4-byte number. That is, various embodiments may return an encoded identifier having a predefined format that is less than 4-bytes or more than 4-bytes and may corresponds to any number of source code files (other than 8K files) and any number of source code lines (other than 256K lines of source code).

Figure 5:
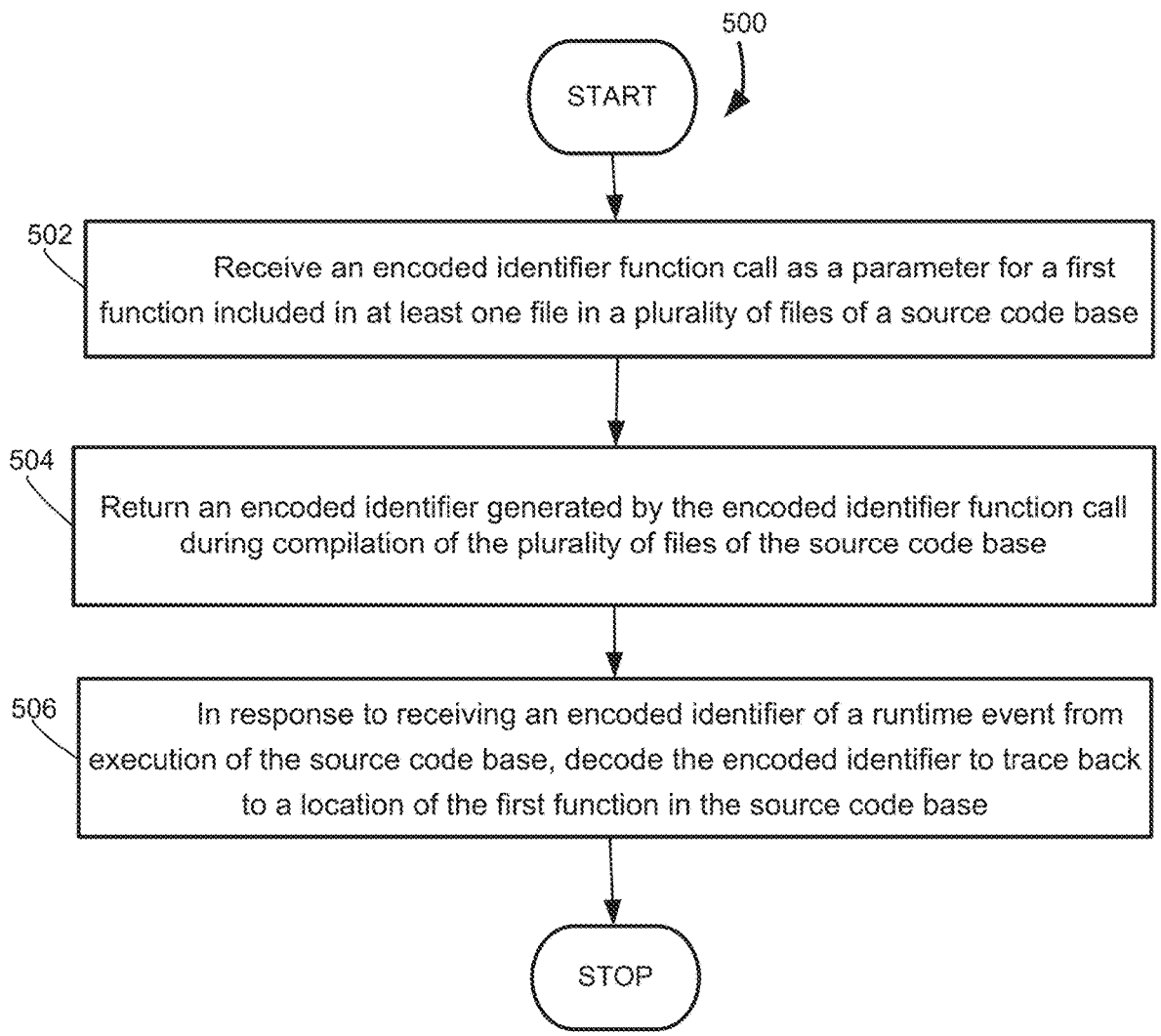
FIG. 5 is an operational flow diagram illustrating a high-level overview of a method for event tracker, in an embodiment.

As shown in FIG. 5, at step 502 of method 500, the event tracker receives an encoded identifier function call as a parameter for a first function included in at least one file in a plurality of files of a source code base. For example, a first file of the source code base may have multiple different functions that include the encoded identifier function call as a respective input parameter. A second file of the source code base may also have multiple different functions that include the same encoded identifier function call as a respective input parameter as well.

At step 504, the event tracker returns an encoded identifier generated by the encoded identifier function call during compilation of the plurality of files of the source code base. For example, each function in the first and second files that has the encoded identifier function call as a respective input parameter will be compiled and each instance of the encoded identifier function call generates a unique encoded identifier. In addition, in one embodiment, during compilation of the source code base, the event tracker generates a filename index number for each respective file of the source code base.

At step 504, in response to receiving an encoded unique identifier for a runtime event from execution of the source code base, the event tracker decodes the encoded identifier to trace back to a location of the first function in the source code base. For example, the event tracker decodes a selected encoded identifier generated during compilation that matches the encoded unique identifier for the runtime event. The event tracker decodes a first portion of a selected encoded identifier to identify a filename of a particular file in the source code base that includes a function that has the encoded identifier function call as a parameter. The event tracker decodes a second portion of the selected encoded identifier to reveal at least one source code line number in the particular file.

Figure 6:
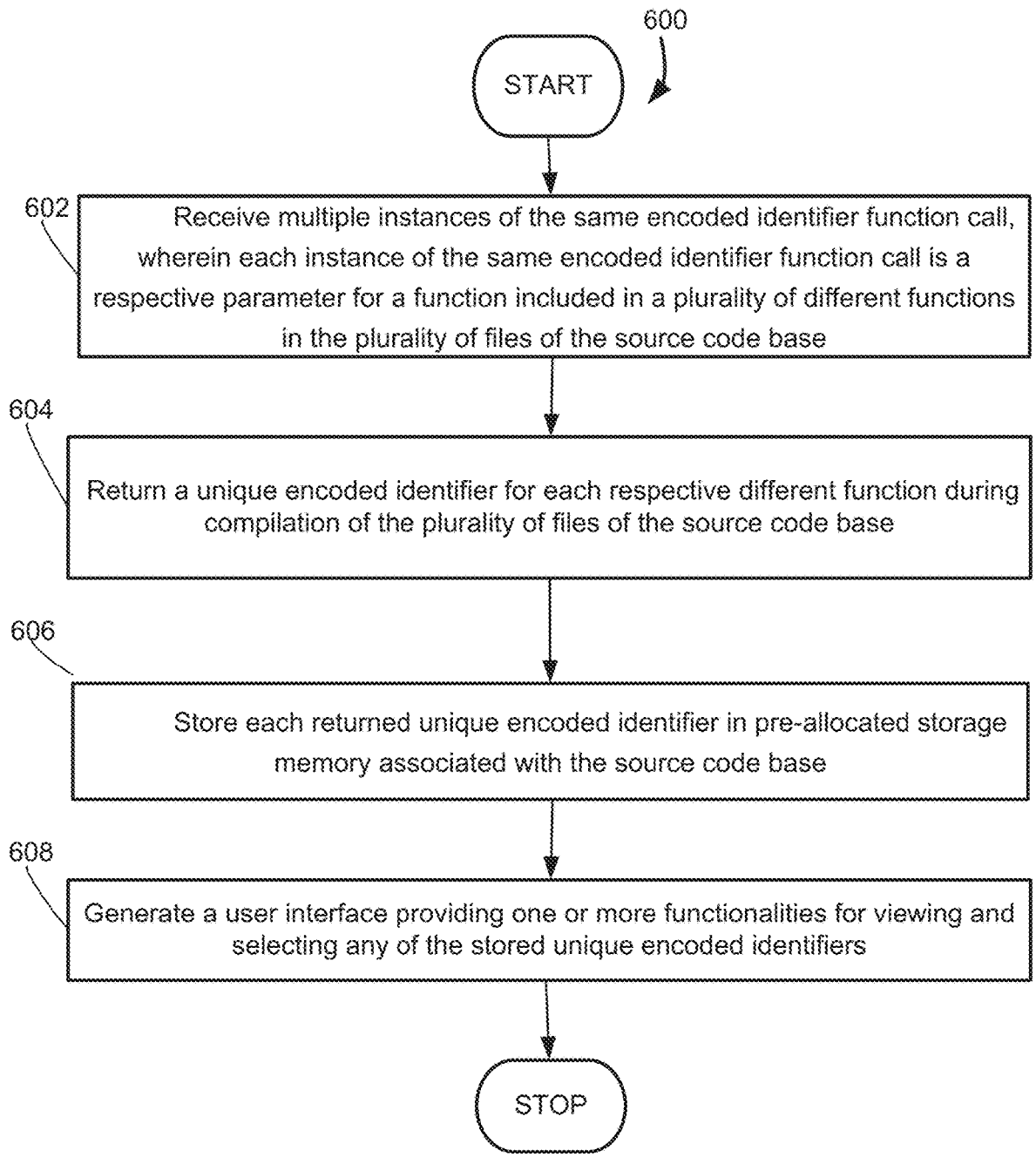
FIG. 6 is an operational flow diagram illustrating a high-level overview of a method for event tracker, in an embodiment.

As shown in FIG. 6, at step 602 of method 600, the event tracker receives multiple instances of the same encoded identifier function call, wherein each instance of the same encoded identifier function call is a respective parameter for a function included in a plurality of different functions in the plurality of files of the source code base. For example, various different types of memory allocation functions in different source code base files, such as AllocSetAllocInternal( . . . ), AllocMinimalChunk( . . . ), may have a different number of different types of input variables. However, such functions will have an input variable that is the same function call to an encoded identifier function, for example, EVLOC( ).

At step 604, the event tracker returns a unique encoded identifier for each respective different function during compilation of the plurality of files of the source code base. For example, each different function in the one or more files being compiled that has the same encoded identifier function as respective parameter will undergo compilation and each instance of the encoded identifier function call will generate a different and unique encoded identifier. The event tracker returns each encoded identifier function instance.

At step 606, the event tracker stores each returned unique encoded identifier in storage memory pre-allocated in the source code base. Each unique encoded identifier may be stored with a corresponding event type that indicates a type of function or processing activity that relates to the corresponding unique encoded identifier.

Figure 7:
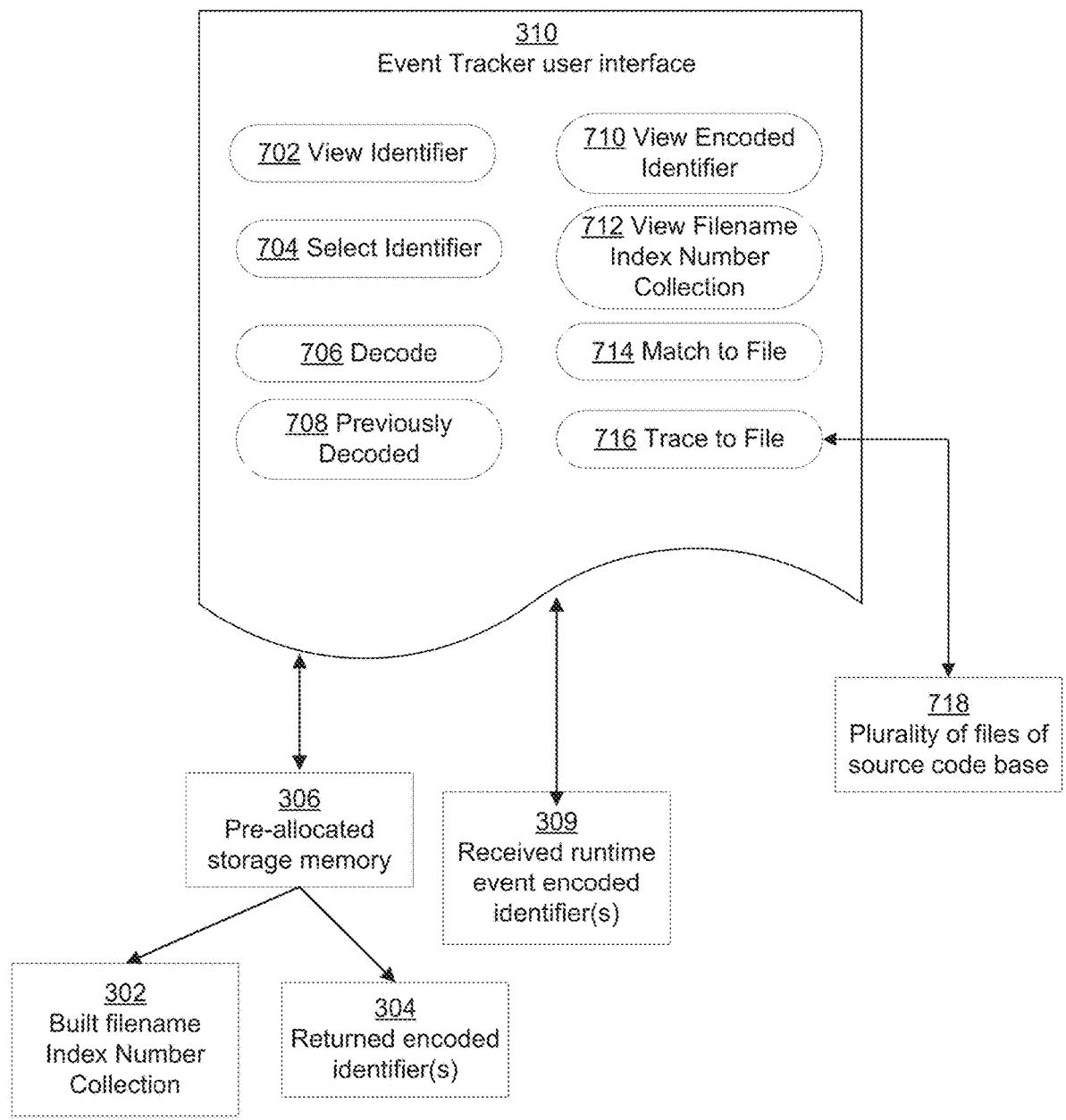
FIG. 7 is a high-level diagram of a user interface of the event tracker, in an embodiment.

At step 608, the event tracker generates a user interface providing one or more functionalities for viewing and selecting any of the stored unique encoded identifiers. As shown in FIG. 7, the event tracker user interface 310 provides a plurality of selectable functionalities 702, 704, 706, 708, 710, 712, 714, 716.

The view identifier functionality 702, upon selection by a developer-user, provides access to memory 306 and a view of any of the returned encoded identifiers 304 generated during compilation. The select identifier functionality 704, upon selection by a developer-user, provides to access memory 306 and an option to select any of the returned encoded identifiers 304 for decoding in order to trace back to a file in the plurality of files in the source code base 718. For example, a developer-user may select an encoded identifier returned during compilation that matches an encoded identifier 309 for a runtime event. The decode functionality 706, upon selection by a developer-user, decodes a selected encoded identifier 304 in order to generate a first portion 400 and a second portion 402. The previously decoded functionality 706, upon selection by a developer-user, provides a historical listing of decoded select identifiers in the current user session and one or more previous user sessions. The historical listing of decoded select identifiers that may also include decoded select identifiers from different user sessions of other developer-users who belong to the same development team.

The view runtime event functionality 710, upon selection by a developer-user, provides access to an encoded identifier of any runtime event(s) 309 and corresponding event type(s). The view collection functionality 712, upon selection by a developer-user, provides access to the built filename index number collection in the memory 306. It is understood that, in various embodiments, the collection 302 need not share the same memory 306 as the returned encoded identifiers 304. The match-to-file functionality 714, upon selection by a developer-user, matches the first portion 400 of a decoded select identifier to a filename index number in the collection 302, which may further provide a mapping to a filename of a particular file that corresponds to the matched filename index number. The trace-to-file functionality 714, upon selection by a developer-user, locates the particular file of the source code base that is represented by the first portion 400. The trace-to-file functionality 714 further accesses the line number represented by the second portion 402 in the particular file and further provides an editable view of source code of a respective function located at the line number.

System Overview

Figure 8:
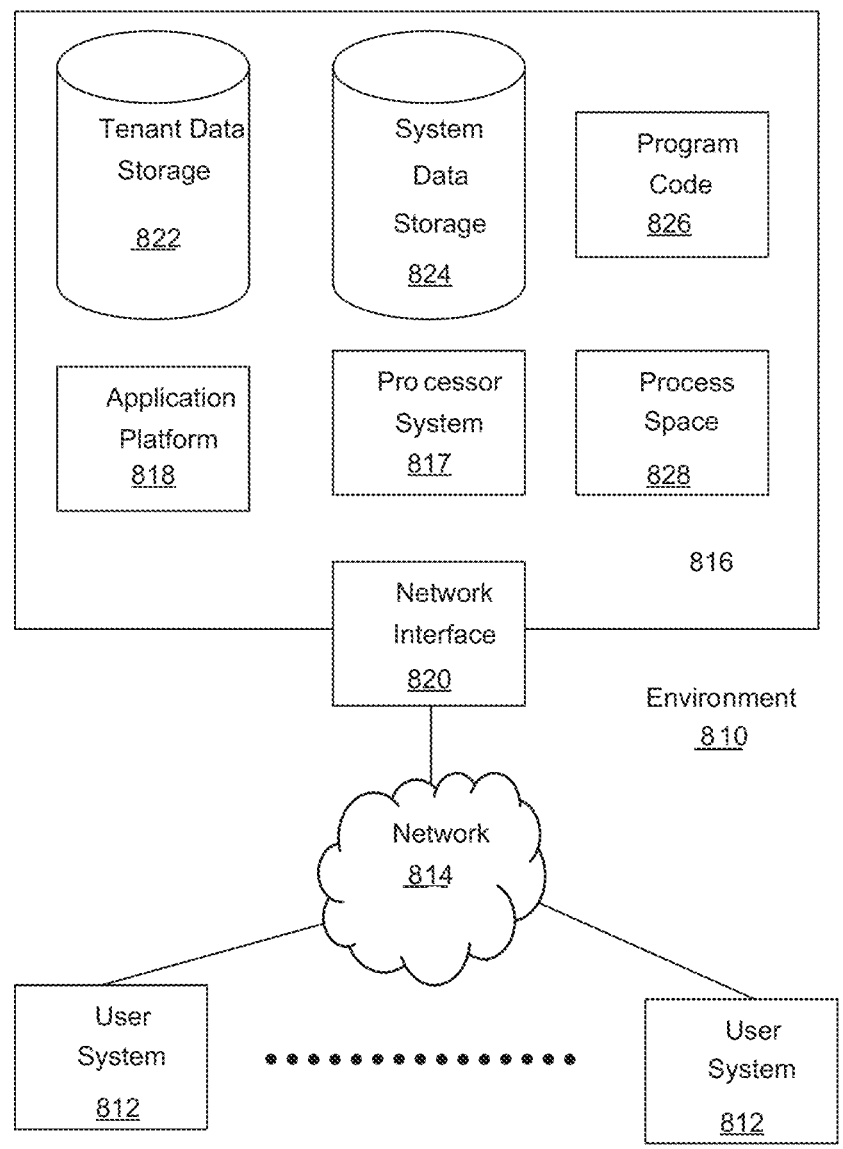

FIG. 8 illustrates a block diagram of an environment 810 wherein an on-demand database service might be used. The environment 810 may include user system(s) 812, a network 814, a system 816, a processor system 817, an application platform 818, a network interface 820, a tenant data storage 822, a system data storage 824, program code 826, and a process space 828. In other embodiments, the environment 810 may not have all of the components listed and/or may have other elements instead of, or in addition to, those listed above.

The environment 810 is an environment in which an on-demand database service exists. A user system 812 may be any machine or system that is used by a user to access a database user system. For example, any of the user systems 812 may be a handheld computing device, a mobile phone, a laptop computer, a workstation, and/or a network of computing devices. As illustrated in FIG. 8 (and in more detail in FIG. 7) the user systems 812 might interact via the network 814 with an on-demand database service, which is the system 816.

An on-demand database service, such as the system 816, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 816" and the "system 816" will be used interchangeably herein. A database image may include one or more database objects. A relational database management system (RDMS) or the equivalent may execute storage and retrieval of information against the database object(s). The application platform 818 may be a framework that allows the applications of the system 816 to run, such as the hardware and/or software, e.g., the operating system. In an embodiment, the on-demand database service 816 may include the application platform 818 which enables creation, managing and executing one or more applications developed by the provider of the on-demand database service, users accessing the on-demand database service via user systems 812, or third-party application developers accessing the on-demand database service via the user systems 812.

The users of the user systems 812 may differ in their respective capacities, and the capacity of a particular user system 812 might be entirely determined by permissions (permission levels) for the current user. For example, where a salesperson is using a particular user system 812 to interact with the system 816, that user system 812 has the capacities allotted to that salesperson. However, while an administrator is using that user system 812 to interact with the system 816, that user system 812 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 814 is any network or combination of networks of devices that communicate with one another. For example, the network 814 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 812 might communicate with the system 816 using TCP/IP and, at a higher network level, use other common Internet protocols to communicate, such as HTTP, FTP, AFS, WAP, etc. In an example where HTTP is used, the user systems 812 might include an HTTP client commonly referred to as a "browser" for sending and receiving HTTP messages to and from an HTTP server at the system 816. Such an HTTP server might be implemented as the sole network interface between the system 816 and the network 814, but other techniques might be used as well or instead. In some implementations, the interface between the system 816 and the network 814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 816, shown in FIG. 8, implements a web-based customer relationship management (CRM) system. For example, in one embodiment, the system 816 includes application servers configured to implement and execute CRM software applications as well as provide related data, code, forms, webpages and other information to and from the user systems 812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 816 implements applications other than, or in addition to, a CRM application. For example, the system 816 may provide tenant access to multiple hosted (standard and custom) applications, including a CRM application. User (or third-party developer) applications, which may or may not include CRM, may be supported by the application platform 818, which manages creation, storage of the applications into one or more database objects and executing of the applications in a virtual machine in the process space of the system 816.

One arrangement for elements of the system 816 is shown in FIG. 8, including the network interface 820, the application platform 818, the tenant data storage 822 for tenant data 823, the system data storage 824 for system data 825 accessible to the system 816 and possibly multiple tenants, the program code 826 for implementing various functions of the system 816, and the process space 828 for executing MTS system processes and tenant-specific processes, such as running applications as part of an application hosting service. Additional processes that may execute on the system 816 include database indexing processes.

Several elements in the system shown in FIG. 8 include conventional, well-known elements that are explained only briefly here. For example, each of the user systems 812 could include a desktop personal computer, workstation, laptop, PDA, cell phone, or any wireless access protocol (WAP) enabled device or any other computing device capable of interfacing directly or indirectly to the Internet or other network connection. Each of the user systems 812 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 812 to access, process and view information, pages and applications available to it from the system 816 over the network 814. Each of the user systems 812 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 816 or other systems or servers. For example, the user interface device may be used to access data and applications hosted by the system 816, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 812 and all of its components are operator configurable using applications, such as a browser, including computer code run using a central processing unit such as an Intel Pentium® processor or the like. Similarly, the system 816 (and additional instances of an MTS, where more than one is present) and all of their components might be operator configurable using application(s) including computer code to run using a central processing unit such as the processor system 817, which may include an Intel Pentium® processor or the like, and/or multiple processor units. A computer program product embodiment includes a machine-readable storage medium (media) having instructions stored thereon/ in which may be used to program a computer to perform any of the processes of the embodiments described herein. Computer code for operating and configuring the system 818 to intercommunicate and to process webpages, applications and other data and media content as described herein are preferably downloaded and stored on a hard disk, but the entire program code, or portions thereof, may also be stored in any other volatile or nonvolatile memory medium or device as is well known, such as a ROM or RAM, or provided on any media capable of storing program code, such as any type of rotating media including floppy disks, optical discs, digital versatile disk (DVD), compact disk (CD), micro-drive, and magneto-optical disks, and magnetic or optical cards, Nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 816 is configured to provide webpages, forms, applications, data and media content to the user (client) systems 812 to support the access by the user systems 812 as tenants of the system 816. As such, the system 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 9:
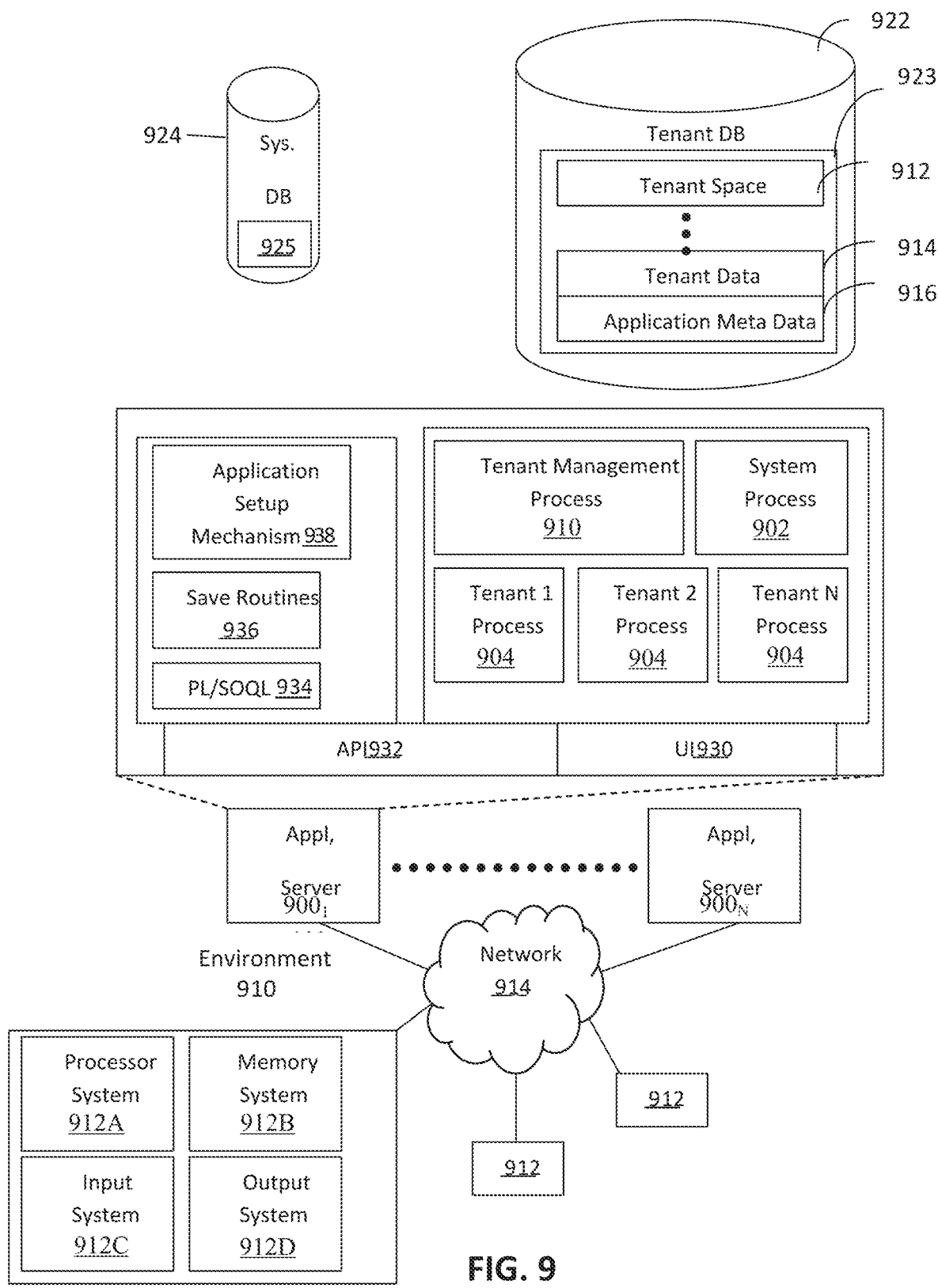
FIG. 9 illustrates a block diagram of an embodiment of elements of FIG. 8 and various possible interconnections between these elements.

FIG. 9 also illustrates the environment 910. However, in FIG. 9 elements of the system 816 and various interconnections in an embodiment are further illustrated. FIG. 9 shows that the each of the user systems 912 may include a processor system 912A, a memory system 912B, an input system 912C, and an output system 912D. FIG. 9 shows the network 914 and also shows that the system 816 may include the tenant data storage 922, the tenant data 923, the system data storage 924, the system data 925, a User Interface (UI) 930, an Application Program Interface (API) 932, a PL/SOQL 934, save routines 936, an application setup mechanism 938, applications servers 900₁-900N, a system process space 902, tenant process spaces 904, a tenant management process space 910, a tenant storage area 912, a user storage (or tenant data) 914, and application metadata 916. In other embodiments, the environment 910 may not have the same elements as those listed above and/or may have other elements instead of, or in addition to, those listed above.

The user systems 812, the network 814, the system 816, the tenant data storage 822, and the system data storage 824 were discussed above in FIG. 8. Regarding the user systems 912, the processor system 912A may be any combination of one or more processors. The memory system 912B may be any combination of one or more memory devices, short term, and/or long-term memory. The input system 912C may be any combination of input devices, such as one or more keyboards, mice, trackballs, scanners, cameras, and/or interfaces to networks. The output system 912D may be any combination of output devices, such as one or more monitors, printers, and/or interfaces to networks. As shown by FIG. 8, the system 816 may include the network interface 820 implemented as a set of HTTP application servers 900, the application platform 818, the tenant data storage 822, and the system data storage 824. Also shown is the system process space 902, including individual tenant process spaces 904 and the tenant management process space 910. Each application server 900 may be configured to access tenant data storage 822 and the tenant data 923 therein, and the system data storage 824 and the system data 925 therein to serve requests of the user systems 812. The tenant data 923 might be divided into individual tenant storage areas 912, which may be either a physical arrangement and/or a logical arrangement of data. Within each tenant storage area 912, the user storage 914 and the application metadata 916 might be similarly allocated for each user. For example, a copy of a user's most recently used (MRU) items might be stored to the user storage 914. Similarly, a copy of MRU items for an entire organization that is a tenant might be stored to the tenant storage area 912. The UI 930 provides a user interface and the API 932 provides an application programmer interface to the system 816 resident processes to users and/or developers at the user systems 812. The tenant data and the system data may be stored in various databases, such as one or more Oracle™ databases.

The application platform 818 includes the application setup mechanism 938 that supports application developers' creation and management of applications, which may be saved as metadata into the tenant data storage 822 by the save routines 936 for execution by subscribers as one or more tenant process spaces 904 managed by the tenant management process 910 for example. Invocations to such applications may be coded using the PL/SOQL 934 that provides a programming language style interface extension to the API 932. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 916 for the subscriber making the invocation and executing the metadata as an application in a virtual machine.

Each application server 900 may be communicably coupled to database systems, e.g., having access to the system data 925 and the tenant data 923, via a different network connection. For example, one application server 900₁ might be coupled via the network 914 (e.g., the Internet), another application server 900$_{N-1}$ might be coupled via a direct network link, and another application server 900$_N$ might be coupled by yet a different network connection. Transfer Control Protocol and Internet Protocol (TCP/IP) are typical protocols for communicating between application servers 900 and the database system. However, it will be apparent to one skilled in the art that other transport protocols may be used to optimize the system depending on the network interconnect used.

In certain embodiments, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In one embodiment, therefore, an interface system implementing a load balancing function (e.g., an F5 Big-IP load balancer) is communicably coupled between the application servers 900 and the user systems 812 to distribute requests to the application servers 900. In one embodiment, the load balancer uses a least connections algorithm to route user requests to the application servers 900. Other examples of load balancing algorithms, such as round robin and observed response time, also may be used. For example, in certain embodiments, three consecutive requests from the same user could hit three different application servers 900, and three requests from different users could hit the same application server 900. In this manner, the system 816 is multi-tenant, wherein the system 816 handles storage of, and access to, different objects, data and applications across disparate users and organizations.

As an example of storage, one tenant might be a company that employs a sales force where each salesperson uses the system 816 to manage their sales process. Thus, a user might maintain contact data, leads data, customer follow-up data, performance data, goals and progress data, etc., all applicable to that user's personal sales process (e.g., in the tenant data storage 822). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 816 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 816 might also maintain system level data usable by multiple tenants or other data. Such system level data might include industry reports, news, postings, and the like that are sharable among tenants.

In certain embodiments, the user systems 812 (which may be client systems) communicate with the application servers 900 to request and update system-level and tenant-level data from the system 816 that may require sending one or more queries to the tenant data storage 822 and/or the system data storage 824. The system 816 (e.g., an application server 900 in the system 816) automatically generates one or more SQL statements (e.g., one or more SQL queries) that are designed to access the desired information. The system data storage 824 may generate query plans to access the requested data from the database.

Each database can generally be viewed as a collection of objects, such as a set of logical tables, containing data fitted into predefined categories. A "table" is one representation of a data object, and a table may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 10:
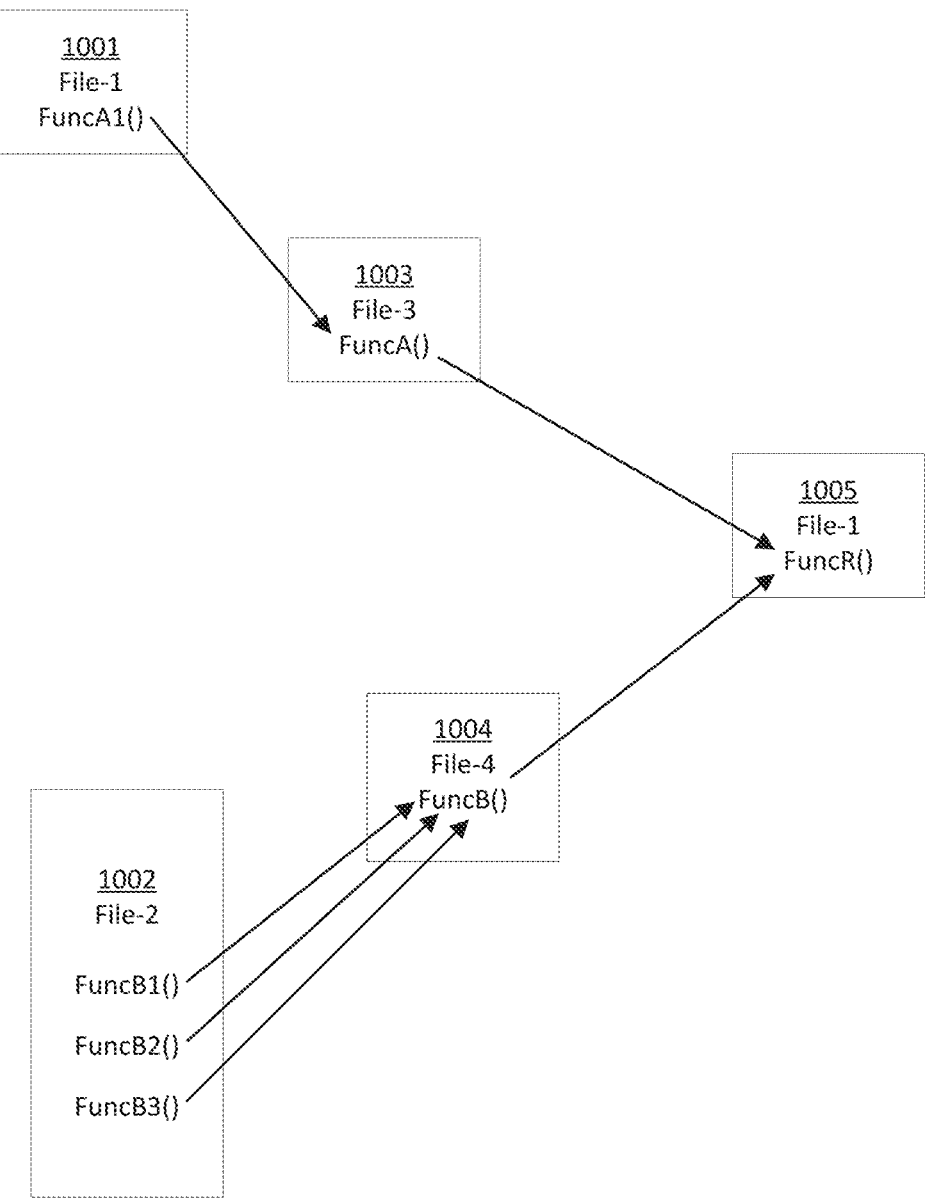
FIG. 10 is an operational flow diagram illustrating a high-level overview of a plurality of functions, in an embodiment.

As shown in FIG. 10, a plurality of functions are defined across a plurality of files in a source code base, such as File-1 1001, File-2 1002, File-3 1003, File-4 1004 and File-5 1005. Each file 1001, 1002, 1003, 1004, 1005 may contain one more software functions, such as FuncA1( ) of File-1 1001 that calls Func(A) of File-3 1003 and FuncB1( ), FuncB2( ) and FuncB3( ) of File-2 1002 that each individually call FuncB( ) of File-4 1004. FuncA( ) and FuncB( ) both call FuncR( ) of File-1 1005 as well. FIG. 10 thereby depicts a hierarchical dataflow based on function calls in a source code base. According to one embodiment, the event tracker may track the lowermost function FuncR( ). Developer-users may be interested in tracking a function caller to FuncR( ), which may be FuncA1( ), FuncB1( ), FuncB2( ), or FuncB3( ). Instances of a first encoded identifier function call, for example, EVLOC( ), may be supplied as a parameter to FuncA( ) and also to FuncB( ). During compilation, an encoded identifier generated by each EVLOC( ) instance may then be passed further down to the lower most function FuncR( ), and stored by the event tracker in allocated storage. At run-time, when a run-time event is generated by execution of FuncR( ), the event tracker receives a unique identifier code from FuncR( )'s run-time execution, which may correspond to any function that called FuncR( ) during run-time. That is, the run-time event associated with FuncR( ) may return an encoded identifier unique to either FuncA( ) or FuncB( ), since both of the functions called FuncR( ) during run-time and both of the functions include an EVLOC( ) function call instance as a parameter that generate a respective unique encoded identifier for FuncA( ) or FuncB( ), respectively, passed to FuncR( ). The event tracker may decode the encoded identifier for the run-time event associated with FuncR( ). The decoded identifier may then uniquely identify either FuncA( ) or FuncB( ) based on a comparison with the encoded identifiers the allocated storage returned by FuncA( ) and FuncB( ) during compilation. By determining whether encoded identifier for the run-time event of FuncR( ) corresponds to FuncA( ) or FuncB( ), a Developer-user can then uniquely identify a location in the source code base of a function call to the FuncR( ) that may be a cause of the FuncR( )'s run-time event.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for tracking runtime events comprising:
   receiving, by a database system, an encoded identifier function call as a parameter for a first function included in at least one file in a plurality of files of a source code base;
   generating, by the database system, a filename index number for each respective file of the source code base during compilation of the source code base;
   returning, by the database system, an encoded identifier generated by the encoded identifier function call during compilation of the plurality of files of the source code base;
   decoding, by the database system, the encoded identifier to trace back to a location of the first function in the source code base in response to receiving a runtime event from execution of the source code base; and
   storing, by the database system, each returned unique encoded identifier in pre-allocated storage memory associated with the source code base.

2. The computer-implemented method of claim 1, further comprising:
   decoding, by the database system, a first portion of the encoded identifier to identify a filename of a particular file in the source code base that includes the first function.

3. The computer-implemented method of claim 1, further comprising:
   decoding, by the database system, the first portion of the encoded identifier to reveal a respective filename index number associated with the particular file in the source code base that includes the first function.

4. The computer-implemented method of claim 2, further comprising:
   decoding, by the database system, a second portion of the encoded identifier to reveal at least one source code line number at which first function appears in the particular file.

5. The computer-implemented method of claim 1, further comprising:
   receiving, by the database system, multiple instances of the same encoded identifier function call, wherein each instance of the same encoded identifier function call is a respective parameter for a function included in a plurality of different functions in the plurality of files of the source code base; and
   returning, by the database system, a unique encoded identifier for each respective different function during compilation of the plurality of files of the source code base.

6. The computer-implemented method of claim 5, further comprising:
   generating, by the database system, a user interface providing one or more functionalities for viewing and selecting any of the stored unique encoded identifiers.

7. A computer program product comprising computer-readable program code to be executed by one or more processors when retrieved from a non-transitory computer-readable medium, the program code including instructions to:
   receive an encoded identifier function call as a parameter for a first function included in at least one file in a plurality of files of a source code base;
   generate a filename index number for each respective file of the source code base during compilation of the source code base;
   return an encoded identifier generated by the encoded identifier function call during compilation of the plurality of files of the source code base; and
   decode the encoded identifier to trace back to a location of the first function in the source code base in response to receiving a runtime event from execution of the source code base; and
   store each returned unique encoded identifier in pre-allocated storage memory associated with the source code base.

8. The computer program product of claim 7, wherein decoding the encoded identifier to trace back to a location of the first function in the source code base comprises:
   decoding a first portion of the encoded identifier to identify a filename of a particular file in the source code base that includes the first function.

9. The computer program product of claim 7, wherein decoding a first portion of the encoded identifier to identify a filename of a particular file comprises:
   decoding the first portion of the encoded identifier to reveal a respective filename index number associated with the particular file in the source code base that includes the first function.

10. The computer program product of claim 8, further comprising:
    decoding a second portion of the encoded identifier to reveal at least one source code line number at which first function appears in the particular file.

11. The computer program product of claim 7, further comprising:
wherein receiving an encoded identifier function call as a parameter comprises:
receiving multiple instances of the same encoded identifier function call, wherein each instance of the same encoded identifier function call is a respective parameter for a function included in a plurality of different functions in the plurality of files of the source code base; and
wherein returning an encoded identifier comprises:
returning a unique encoded identifier for each respective different function during compilation of the plurality of files of the source code base.

12. The computer program product of claim 11, further comprising:
generating a user interface providing one or more functionalities for viewing and selecting any of the stored unique encoded identifiers.

13. A system comprising:
one or more processors; and
a non-transitory computer readable medium storing a plurality of instructions, which when executed, cause the one or more processors to:
receive an encoded identifier function call as a parameter for a first function included in at least one file in a plurality of files of a source code base;
generate a filename index number for each respective file of the source code base during compilation of the source code base;
return an encoded identifier generated by the encoded identifier function call during compilation of the plurality of files of the source code base; and
decode the encoded identifier to trace back to a location of the first function in the source code base in response to receiving a runtime event from execution of the source code base; and
store each returned unique encoded identifier in pre-allocated storage memory associated with the source code base.

14. The system of claim 13, wherein decoding the encoded identifier to trace back to a location of the first function in the source code base comprises:
decoding a first portion of the encoded identifier to identify a filename of a particular file in the source code base that includes the first function.

15. The system of claim 13, wherein decoding a first portion of the encoded identifier to identify a filename of a particular file comprises:
decoding the first portion of the encoded identifier to reveal a respective filename index number associated with the particular file in the source code base that includes the first function.

16. The system of claim 15, further comprising:
decoding a second portion of the encoded identifier to reveal at least one source code line number at which first function appears in the particular file.

17. The system of claim 13, further comprising:
wherein receiving an encoded identifier function call as a parameter comprises:
receiving multiple instances of the same encoded identifier function call, wherein each instance of the same encoded identifier function call is a respective parameter for a function included in a plurality of different functions in the plurality of files of the source code base;
wherein returning an encoded identifier comprises:
returning a unique encoded identifier for each respective different function during compilation of the plurality of files of the source code base; and
generating a user interface providing one or more functionalities for viewing and selecting any of the stored unique encoded identifiers.

* * * * *